(12) United States Patent
Amstutz

(10) Patent No.: US 9,593,043 B2
(45) Date of Patent: Mar. 14, 2017

(54) MACRO DEFECT FREE CEMENT WITH IMPROVED MOISTURE RESISTANCE

(71) Applicant: Caterpillar Inc., Peoria, IL (US)

(72) Inventor: Aaron K. Amstutz, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 91 days.

(21) Appl. No.: 14/610,469

(22) Filed: Jan. 30, 2015

(65) Prior Publication Data

US 2016/0221871 A1 Aug. 4, 2016

(51) Int. Cl.

| | | |
|---|---|---|
| C04B 7/32 | (2006.01) | |
| C04B 28/06 | (2006.01) | |
| B29C 47/00 | (2006.01) | |
| C04B 103/00 | (2006.01) | |
| C04B 111/00 | (2006.01) | |
| C04B 111/28 | (2006.01) | |
| B29K 29/00 | (2006.01) | |
| B29K 309/06 | (2006.01) | |
| B29L 31/10 | (2006.01) | |

(52) U.S. Cl.
CPC ............ *C04B 7/32* (2013.01); *B29C 47/0004* (2013.01); *C04B 28/06* (2013.01); *B29K 2029/04* (2013.01); *B29K 2309/06* (2013.01); *B29L 2031/10* (2013.01); *C04B 2103/0046* (2013.01); *C04B 2103/0062* (2013.01); *C04B 2111/00301* (2013.01); *C04B 2111/28* (2013.01)

(58) Field of Classification Search
CPC ........ C04B 7/32; C04B 28/06; B29C 47/0004
See application file for complete search history.

(56) References Cited

U.S. PATENT DOCUMENTS

| | | | |
|---|---|---|---|
| 4,410,366 | A | 10/1983 | Birchall et al. |
| 4,961,790 | A | 10/1990 | Smith et al. |
| 5,106,890 | A | 4/1992 | Maruhashi et al. |
| 6,306,210 | B1 | 10/2001 | Miksic et al. |
| 6,348,093 | B1 | 2/2002 | Rieder et al. |
| 6,797,052 | B1 | 9/2004 | Chowdhury |

(Continued)

FOREIGN PATENT DOCUMENTS

| | | |
|---|---|---|
| DE | 3643464 | 6/1988 |
| EP | 0280971 A1 | 9/1988 |

(Continued)

OTHER PUBLICATIONS

Machine translation of JP 2010-159378. Jul. 2010.*

(Continued)

*Primary Examiner* — John Uselding
(74) *Attorney, Agent, or Firm* — Finnegan, Henderson, Farabow, Garrett & Dunner, LLP

(57) ABSTRACT

A cementitious composition may include polyvinyl alcohol, high alumina cement, water, a metallic coagent, a peroxide crosslinking initiator, and an organic acid retardant. A molded article may be manufactured from the cementitious composition by preparing a hydrogel pre-polymer blend of saponified polyvinyl alcohol acetate (PVAA) with greater than or equal to approximately 85% saponified PVAA, and water, mixing the hydrogel pre-polymer blend with high alumina cement (HAC) using a high shear mixing process, mixing in a metallic coagent and a peroxide crosslinking initiator, mixing in an organic acid retardant, and hot press molding the mixture.

14 Claims, 2 Drawing Sheets

(56) References Cited

U.S. PATENT DOCUMENTS

| | | |
|---|---|---|
| 8,277,556 B2 | 10/2012 | Berke et al. |
| 2005/0172862 A1 | 8/2005 | Rich |
| 2012/0067250 A1 | 3/2012 | Bracegirdle |
| 2014/0293728 A1 | 10/2014 | Duveau et al. |

FOREIGN PATENT DOCUMENTS

| | | |
|---|---|---|
| EP | 0 585 998 B1 | 8/1993 |
| EP | 0 590 948 B1 | 9/1993 |
| JP | 11314643 | 11/1999 |
| JP | 2010159378 A | 7/2010 |

OTHER PUBLICATIONS

Zhang, Wei. Synthesis and Fracture Toughness of Macro-Defect-Free (MDF) Cement. Master's Thesis. Urbana, Illinois. 2014.*

Russell: "Moisture Resistance of Macrodefect-Free Cement", Ceremaic Transactions, American Ceramic Society, US, vol. 16, Jan. 1, 1991, pp. 501-519, XP009189454, ISSN: 1042-1122.

Popoola O O et al: "Microstructural and Microchemical Characterization of a Calcium Aluminate-Polymer Composite (MDF Cement)", Journal of the American Ceramic Society, Blackwell Publishing, Malden, MA, US, vol. 74, No. 8, Aug. 1, 1991, pp. 1928-1933, XP000230590, ISSN: 0002-7820, DOI: 10.1111/J.1151-2916.1991.TB07811.X.

Amstutz A., "Dissolvable Cementitious Composite Ingredient Packet", U.S. Appl. No. 14/610,508, filed Jan. 30, 2015.

Bonapasta, A. A. et al., "Cross-Linking of Poly(Vinyl Alcohol) Chains by Ca Iions in Macro-Defect-Free Cements," *American Cancer Society*, 14, pp. 1016-1022, 2002.

Bortzmeyer, D. et al., "Microstructure and mechanical properties of macro-defect-free cements," *Journal of Materials Science*, 30, pp. 4138-4144, 1995.

Donatello, S. et al., "Recent developments in macro-defect-free (MDF) cements," *Construction and Building Materials*, 23, pp. 1761-1767, 2009.

Drábik, M. et al., "Macro Defect Free Materials; Mechanochemical Activation of Raw Mixes as the Intensifying Tool of the Entire MDF Synthesis," *Ceramics—Silikáty*, 57 (2), pp. 120-125, 2013.

Drábik, M. et al., "Macro Defect Free Materials; The Challenge of Mechanochemical Activation," *Ceramics—Silikáty*, 56 42), pp. 396-401, 2012.

Lepingle, M., et al., "Esterfication with H.A.C."

Lepingle, M., et al., "Use of the hydraulic binders as condensation agents in organic reactions by the elimination of water," 2 pgs., 1956.

Milliken, "GeoFuse™ Advanced Geopolymer Coating," Technical Data Sheet, Nov. 2013.

Rai, S.K. et al., "Synthesis and Characterization of Polyvinyl alcohol hydrogel," Proceedings of 2010 International Conference on Systems in Medicine and Biology, IIT Kharagpur, India, pp. 360-364, Dec. 16-18, 2010.

Young, J.F., Cement Paste Matrix Composite Materials Center—Final Report—Jan. 1990.

* cited by examiner

US 9,593,043 B2

MACRO DEFECT FREE CEMENT WITH IMPROVED MOISTURE RESISTANCE

TECHNICAL FIELD

The present disclosure relates generally to macro-defect-free (MDF) cementitious compositions, and more particularly, to MDF cementitious compositions with moisture resistance.

BACKGROUND

Roadways, sidewalks, bridges, buildings, water ducts, reservoirs, and other infrastructure and structural components are often manufactured from cementitious composites such as concrete. Concrete includes cement and other things, such as various aggregates and paste. Aggregates include small materials such as sand, gravel or crushed stone. Often, the paste that holds the aggregates together is water and Portland cement. Portland cement is a generic term for the most prevalent type of cement. Cement typically makes up from 10% to 15% of the total mass of concrete. Portland cement is a type of hydraulic cement, which means that when water is added, a chemical reaction is started that causes the cement to harden and set, holding the aggregates together in a rocklike mixture—concrete. Before the concrete is allowed to harden, the concrete mix is poured into a mold so that it will harden into the desired shape. The Portland cement is typically made from a combination of calcareous material (usually limestone or other calcium carbonate-based materials) and argillaceous material (usually siliceous and aluminous minerals containing substantial amounts of clay-like components). A wide range of chemicals are added to concrete that act as plasticizers, accelerators, retardants, dispersants, and water-reducing agents. Called admixtures, these additives can be used to increase the workability of a concrete mixture, the strength of the concrete, the amount of time the concrete will take to harden and achieve full strength, and other desirable properties. The proportions of the various raw materials that go into the concrete must be carefully controlled and measured in order to obtain a finished product with the desired characteristics.

High strength cement-based materials such as macro-defect-free (MDF) cements are being developed for use in many applications that have not been possible with traditional cement and concrete technology. MDF refers to the absence of relatively large voids or defects which are usually present in conventional mixed cement pastes because of entrapped air, inadequate dispersion, and porosity that develops as water soaks into cement particles and aggregate and leaves behind voids. Such voids and defects limit the strength of conventional Portland cement. MDF cement is a polymer-cement composite. The polymer and cement react synergistically to create a unique microstructure with distinct characteristics. The base polymer of the cementitious composite of MDF cement is a water-dissolvable polymer, such as polyvinyl alcohol. High shear mixing and hot press molding processes are typically applied to the mixture during production. MDF cements are characterized by very high flexural strength and a high modulus of elasticity. Flexural strength, also known as modulus of rupture, bend strength, or fracture strength, is a mechanical parameter for a material's ability to resist deformation under load. Modulus of elasticity is a number that measures an object or substance's resistance to being deformed elastically when a force is applied to it. The relatively high flexural strength and high modulus of elasticity of MDF cements are thought to be a result of the elimination of the majority of the voids that are in typical cementitious composites caused by air entrapped during the mixing, and the elimination of the majority of pores and capillaries that are formed when water is desiccated during cement hydration.

In spite of the promising mechanical properties of MDF cement materials, they have not been successfully commercialized because of poor water resistance. The water-soluble polyvinyl alcohol base polymer continues to be hydrophilic even after the initial curing reaction and the subsequent water uptake lowers both the strength and modulus to less than half their original values. Many investigators have explored both chemistry modifications to the MDF cement mixture and coatings or surface treatments to render the material less hydrophilic.

European Patent EP0585998 B1 discloses a process for improving the moisture resistance through carbonation of a molded item. This process of carbonation requires immersion of an item in a water bath into which carbon dioxide gas is bubbled. This type of process may indeed render the surface of an item less susceptible to degradation but will not provide long-term water resistance to a thick item.

The disclosed cementitious compositions are directed to overcoming one or more of the problems set forth above and other problems of the prior art.

SUMMARY

In one aspect, the present disclosure is directed to a cementitious composition. The cementitious composition may include polyvinyl alcohol, high alumina cement, water, a metallic coagent, and a peroxide crosslinking initiator.

In another aspect, the present disclosure is directed to a molded article made from a macro-defect-free (MDF) cementitious composition. The MDF cementitious composition may include polyvinyl alcohol, high alumina cement, water, a metallic coagent, and a peroxide crosslinking initiator.

In yet another aspect, the present disclosure is directed to a method of manufacturing a molded article made from a MDF cementitious composition. The method may include preparing a hydrogel pre-polymer blend of saponified polyvinyl alcohol acetate (PVAA) with greater than or equal to about 85% saponified PVAA, and water. The method may further include mixing the hydrogel pre-polymer blend with high alumina cement (HAC) using a high shear mixing process, mixing in a metallic coagent and a peroxide crosslinking initiator, and mixing in an organic acid retardant. The method may still further include hot press molding the mixture at approximately 5 MPa pressure or greater at approximately 90 degrees C. for approximately 30 minutes.

DETAILED DESCRIPTION

Figure 1:
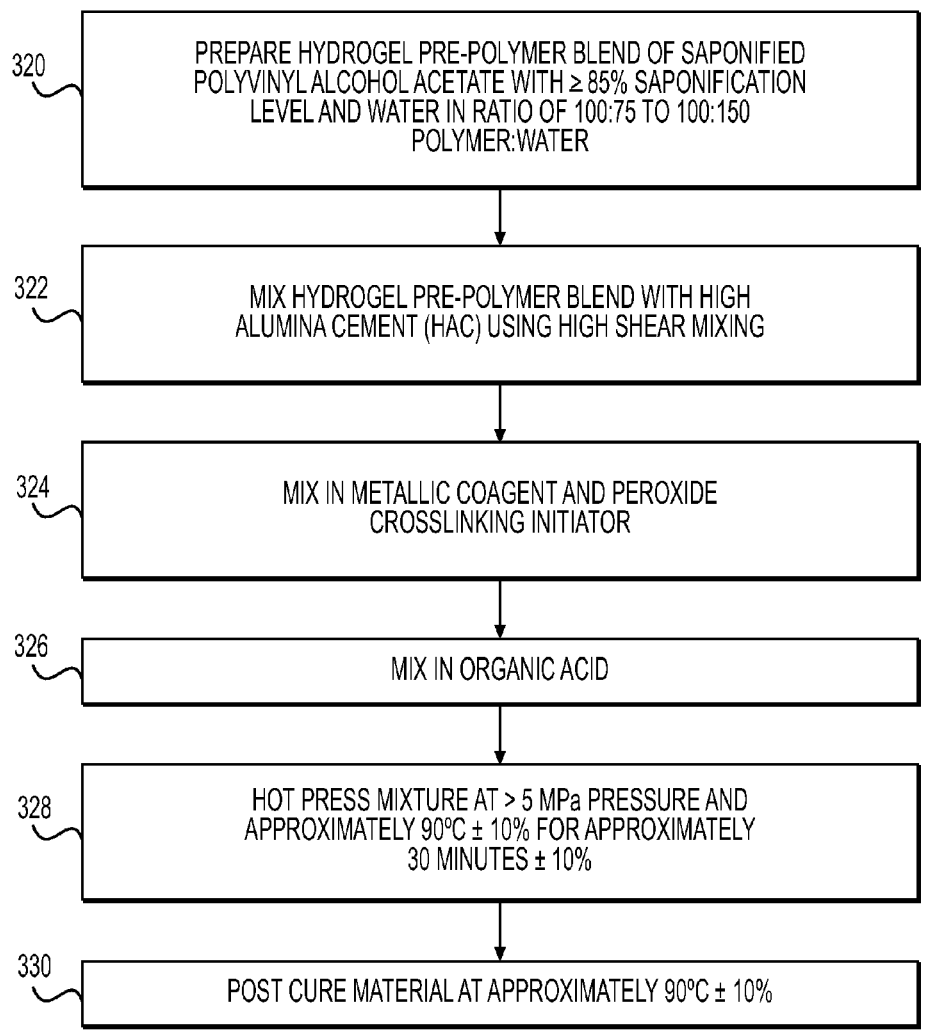
FIG. 1 is a flowchart illustrating exemplary steps for fabricating a moldable product made from a cementitious composition in accordance with various embodiments of this disclosure.

The base polymer of high strength cementitious composites, and in particular, macro-defect-free (MDF) cementitious composites, is a water-soluble, hydrophilic polymer such as polyvinyl alcohol (PVOH). High alumina cements (HACs) have been found to give superior strength compared to other cement types used in MDF cements. The surfaces of high alumina cement particles are abraded during mixing which releases both calcium ions and aluminum ions into solution to form $Ca(OH)_2$ and $Al(OH)_3$ along with various other charged species (for example $Ca(OH)_3^-$ and $Al(OH)_4^-$ may be present). The alcohol side groups of the PVOH polymer then chemically bind with the ionic species generated and form a highly crosslinked ionomer—which reduces polymer chain flexibility and makes for a rigid composite.

However, the hydrophilic polymer, polyvinyl alcohol (PVOH) used in MDF cements may cause residual water uptake that lowers the strength and modulus of elasticity of a finished product made from the MDF cement upon exposure to water or water vapor. Continued exposure of the finished, molded product to water or water vapor after the MDF cement has solidified may displace some of the ionic crosslinking and thereby compromise the strength and modulus of elasticity of the finished product. In some applications utilizing conventional MDF cement, it has been found that over half of the starting strength and two-thirds of the starting modulus of elasticity of the cement may be lost after just a few weeks of water immersion.

The MDF cementitious compositions in accordance with various embodiments of this disclosure are materials that have, as a considerable part of their strength, reliance upon ionic and covalent bonding associated with hydrated minerals and gels. Compared to traditional cements and concretes, these MDF cements are characterized by a very high flexural strength (>100 MPa) and modulus of elasticity (>30 GPa). High shear mixing results in low amounts of defects that may be caused by voids, pores, or capillaries left behind in more traditional cement composites from air bubbles or the evaporation of water. The high polymer content and low water content in accordance with various implementations of this disclosure result in the MDF cementitious composite behaving like an elastomer during the mixing and curing processes.

Various additives and methods of manufacturing have been tried in order to improve retention of the starting strength and modulus of elasticity after water immersion or exposure to extended periods of high humidity. Some methods that have been explored include the addition of aminosilanes, the addition of titanates, and the substitution of phenolic resins for polyvinyl alcohol. None of these methods have yielded an acceptable water resistance with minimal impact to processing and cost.

The novel MDF cement recipe of this disclosure is based on a mixture of polyvinyl alcohol polymer, water, and high alumina cement. Polyvinyl alcohol (PVOH) is prepared by the saponification of polyvinyl acetate (PVAA). The polyvinyl alcohol that has typically been used in the composition of conventional MDF cement is a 78%-80% saponified polyvinyl alcohol acetate (PVAA). Grades of PVAA with saponification levels below about 85% are referred to in this disclosure as "lower saponification grades", and grades of PVAA with saponification levels equal to or greater than 85% are referred to as "higher saponification grades". It has been found that PVOH produced from the lower saponification grades of PVAA provide a good balance of strength and processing time. However, a problem with the PVOH obtained from 78%-80% saponified PVAA is that these lower saponification grades are not readily available, and are significantly more expensive than higher saponification grades with 85% or higher saponified PVAA. The lower saponification grades of PVAA have higher percentages of residual acetates, and the higher saponification grades of PVAA have lower percentages of residual acetates. For example, a 70% saponified grade of PVAA has approximately 30% residual acetates, and a 90% saponified grade of PVAA has approximately 10% residual acetates.

As the saponification percentage of PVAA increases, and the amount of residual acetates decreases, the available time for mixing and molding of the MDF cement is significantly reduced. The alkalinity of the MDF cement mixture saponifies the residual acetate groups and generates alcohol groups insitu. This chemical step slows the crosslinking rate of the PVOH with ionic species and the acetate counter ions also slows the crosslinking rate. However, grades of PVAA with higher levels of saponification, such as higher saponification grades with greater than or equal to 85% saponified PVAA, are less expensive and more readily available than the lower saponification grades of 78%-80% saponified PVAA that have traditionally been used in MDF cement compositions. Nevertheless, these higher saponification grades of PVAA have not been used in MDF cements because of their short processing times. Various implementations of the present disclosure allow for the use of these more readily available and less expensive higher saponification grades of PVAA by the addition of an appropriate retarder to the recipe. Effective retarders may include organic acid retardants such as acetic acid, citric acid, tartartic acid, succinic acid, and polymeric acids such as polyacrylic acid. The addition of these organic acid retardants to the MDF cement compositions may allow for adequate processing time when using grades of PVAA with saponification levels that are greater than or about equal to 85%.

In some preferred implementations of this disclosure, at least a portion of the water that is incorporated into the recipe for the improved MDF cement is pre-combined with the PVOH polymer to make a hydrogel elastomeric material that is conducive to high-shear mixing on a two-roller mill or an internal mixer such as a BANBURY®-type internal mixer. It has been found that a polymer:water ratio in the range from 100:75 to 100:150 provides an ideal hydrogel elastomer for rubber-like high-shear mixing. The PVOH polymer that yields a MDF cement with the best properties for mixing and for molded articles generally has a high molecular weight. For PVOH, the molecular weight is related to a 4% solution viscosity. A solution viscosity of 20 centipoise or greater is generally desired for the best combination of processing, strength, and modulus of elasticity. This high molecular weight/high viscosity characteristic results in a MDF cement that exhibits thixotropic properties. In a preferred embodiment, a 4% solution viscosity of over 40 centipoise represents a polymer with excellent processing characteristics and excellent mechanical properties of a molded article. With these high molecular weight polymers, a hydrogel elastomer may be prepared by mixing 100 parts of polymer and 75-150 parts of water and homogenizing the blend by heating to 70° C.-90° C. for 16-24 hours. In some embodiments, this polymer-water hydrogel may be prepared ahead of when the final mixing and molding of a final article will occur. The polymer-water hydrogel elastomer may then be mixed with high alumina cement (HAC) using high-shear mixing, such as by employing a single screw extruder, a twin screw extruder, a continuous compounding mixer such as the FARREL CONTINUOUS MIXER (FCM™), a kneader such as the BUSS KNEADER™ manufactured by Buss AG of Switzerland, a two-roll mill, or an internal mixer such as the BANBURY®-type internal mixer.

The aforementioned organic acid retardants may be added during the early stages of mixing of the MDF composition. If any additional water is to be added (beyond that already combined in the polymer-water hydrogel elastomer), it may also be added near the beginning of the mixing sequence. Heat and pressure applied to the mixed MDF cement molds it into a desired configuration and results in the material quickly curing to achieve adequate handling strength.

Example 1 below discloses a recipe for a MDF cement composition in accordance with an embodiment of this disclosure, wherein the MDF cement composition includes an organic acid retardant, polyacrylic acid:

Example 1

| | | |
|---|---|---|
| Polymer | Selvol 540 | 100 parts by weight |
| Water | (120 parts combined with polymer, 60 parts added with cement) | 120 + 60 parts by weight |
| Cement - 71% alumina HAC | Secar 71 | 1500 parts by weight |
| Retarder - polyacrylic acid | Sokalan CP 10S | 20 parts by weight |

The recipe in Example 1 was mixed on a two-roll mill and molded in a heated hydraulic press (>5 MPa pressure) at ~90° C. for >30 minutes. The sample material was then postcured at approximately 90° C. for 48 hours and then cut into flexural bars (~4 mm thick×~14 mm wide×~150 mm long). The material initial properties were assessed and then samples were immersed in a stagnant water bath for various lengths of time and the changes in flexural properties were measured. The results of these measurements are shown in Table 1:

TABLE 1

| | | |
|---|---|---|
| No aging | Initial strength (max), MPa | 203 |
| | Initial modulus (avg), GPa | 57 |
| 2 week water immersion | Strength (max), MPa | 130 |
| | Modulus (avg), GPa | 25 |
| 5 weeks immersion | Strength (max), MPa | 127 |
| | Modulus (avg), GPa | 18 |
| 9 weeks immersion | Strength (max), MPa | 83 |
| | Modulus (avg), GPa | 15 |
| 12 weeks immersion | Strength (max), MPa | 76 |
| | Modulus (avg), GPa | 13 |

As can be seen in Table 1, the embodiment including the addition of an organic acid retardant to a MDF cement composition made with a higher saponification grade of PVAA (≥85% saponified) still has a significant reduction in flexural strength and modulus of elasticity upon long-term water immersion, despite having an excellent initial strength.

In accordance with various preferred embodiments of the present disclosure, it has been unexpectedly discovered that the inclusion of a metallic coagent and peroxide crosslinking initiator can significantly improve the moisture resistance of products made from MDF cementitious compositions without the problems associated with adding titanates or zirconates, as attempted in some conventional MDF cementitious compositions. Examples of the metallic coagents that may be added to the MDF cementitious composition in accordance with various preferred embodiments of this disclosure may include zinc diacrylate (ZDA), zinc monoacrylate (ZMA), zinc dimethacrylate (ZDMA), calcium diacrylate (CDA), aluminum triacrylate, magnesium diacrylate, and other similar metal-bound reactive monomers that may be reacted with peroxides. Peroxide crosslinking initiators that may find utility in such recipes include dicumyl peroxide (tradename DI-CUP, a,a'-bis(tert-butylperoxy)diisopropylbenzene (tradename VUL-CUP), 1,1-di(tert-butylperoxy)-3,3,5-trimethylcyclohexane (tradename LUPEROX 231), n-butyl-4,4-di(t-butylperoxy)valerate (tradename LUPEROX 230), and lower-temperature peroxides such as methyl ethyl ketone peroxide (MEKP) or hydrogen peroxide.

Example 2 below discloses a recipe prepared using this combination of metallic coagent and peroxide crosslinking initiator.

Example 2

| | | |
|---|---|---|
| Polymer | Selvol 540 | 100 parts by weight |
| Water | (120 parts combined with polymer, 100 parts added with cement) | 120 + 100 parts by weight |
| Cement - 71% alumina HAC | Secar 71 | 2000 parts by weight |
| Processing aid | Zinc Stearate | 20 parts by weight |
| Metallic Coagent - Calcium Diacrylate | Dymalink 636 (SR636) | 60 parts by weight |
| Peroxide crosslinking initiator | Di-Cup 40KE | 20 parts by weight |

The recipe in Example 2 was mixed on a two-roll mill and molded in a heated hydraulic press (>5 MPa pressure) at ~90° C. for >30 minutes. The sample material was then postcured at 90° C. for 24 hours and then cut into flexural bars (~4 mm thick×~14 mm wide×~150 mm long). The material initial properties were assessed and then samples were immersed in a stagnant water bath for various lengths of time and the change in flexural properties were measured. This data is shown in Table 2.

TABLE 2

| | | |
|---|---|---|
| No aging | Initial strength (max), MPa | 121 |
| | Initial modulus (avg), GPa | 56 |
| 2 week water immersion | Strength (max), MPa | 92 |
| | Modulus (avg), GPa | 40 |
| 4 weeks immersion | Strength (max), MPa | 108 |
| | Modulus (avg), GPa | 36 |
| 8 weeks immersion | Strength (max), MPa | 105 |
| | Modulus (avg), GPa | 27 |
| 12 weeks immersion | Strength (max), MPa | 94 |
| | Modulus (avg), GPa | 28 |

As can be seen in Table 2, the material of example 2 exhibits much less reduction in both strength and modulus of elasticity compared to the material of example 1 that did not contain both the peroxide and metallic coagent. Furthermore, this material exhibits better shelf life and processability than formulations that contain titanates or zirconates as a moisture resistant additive.

Example 3 below combines the excellent shelf life benefits of adding an organic acid retardant with the moisture resistant benefits of combined peroxide and metallic coagent. The organic acid retardant may help with moisture resistance as well.

Example 3

| | | |
|---|---|---|
| Polymer | Selvol 540 | 100 parts by weight |
| Water | (120 parts combined with polymer, 80 parts added with cement) | 120 + 80 parts by weight |
| Cement - 71% alumina HAC | Secar 71 | 2000 parts by weight |
| Organic acid retarder | Citric Acid (50% soln) | 20 parts by weight |
| Metallic Coagent - Zinc Diacrylate | Dymalink 705 (SR705) | 50 parts by weight |
| Peroxide crosslinking agent | Di-Cup 40KE | 10 parts by weight |

The recipe in Example 3 was mixed on a two-roll mill and molded in a heated hydraulic press (>5 MPa pressure) at ~90° C. for >30 minutes. The sample material was then postcured at 90° C. for 24 hours and then cut into flexural bars (~4 mm thick×~14 mm wide×~150 mm long). The material initial properties were assessed and then samples were immersed in a stagnant water bath for various lengths of time and the change in flexural properties were measured. This data is shown in Table 3.

TABLE 3

| | | |
|---|---|---|
| No aging | Initial strength (max), MPa | 113 |
| | Initial modulus (avg), GPa | 39 |
| 2 week water immersion | Strength (max), MPa | 138 |
| | Modulus (avg), GPa | 36 |
| 5 weeks immersion | Strength (max), MPa | 107 |
| | Modulus (avg), GPa | 36 |
| 8 weeks immersion | Strength (max), MPa | 89 |
| | Modulus (avg), GPa | 34 |
| 12 weeks immersion | Strength (max), MPa | 82 |
| | Modulus (avg), GPa | 35 |

As can be seen in Table 3, the combination of organic acid retardant, peroxide, and metallic coagent yields a MDF cement with very little loss in flexural strength or modulus of elasticity after long-term water immersion. Furthermore, because of the organic acid retardant, this formulation has excellent shelf life (>1 hr) and flows well in a mold.

Figure 2:
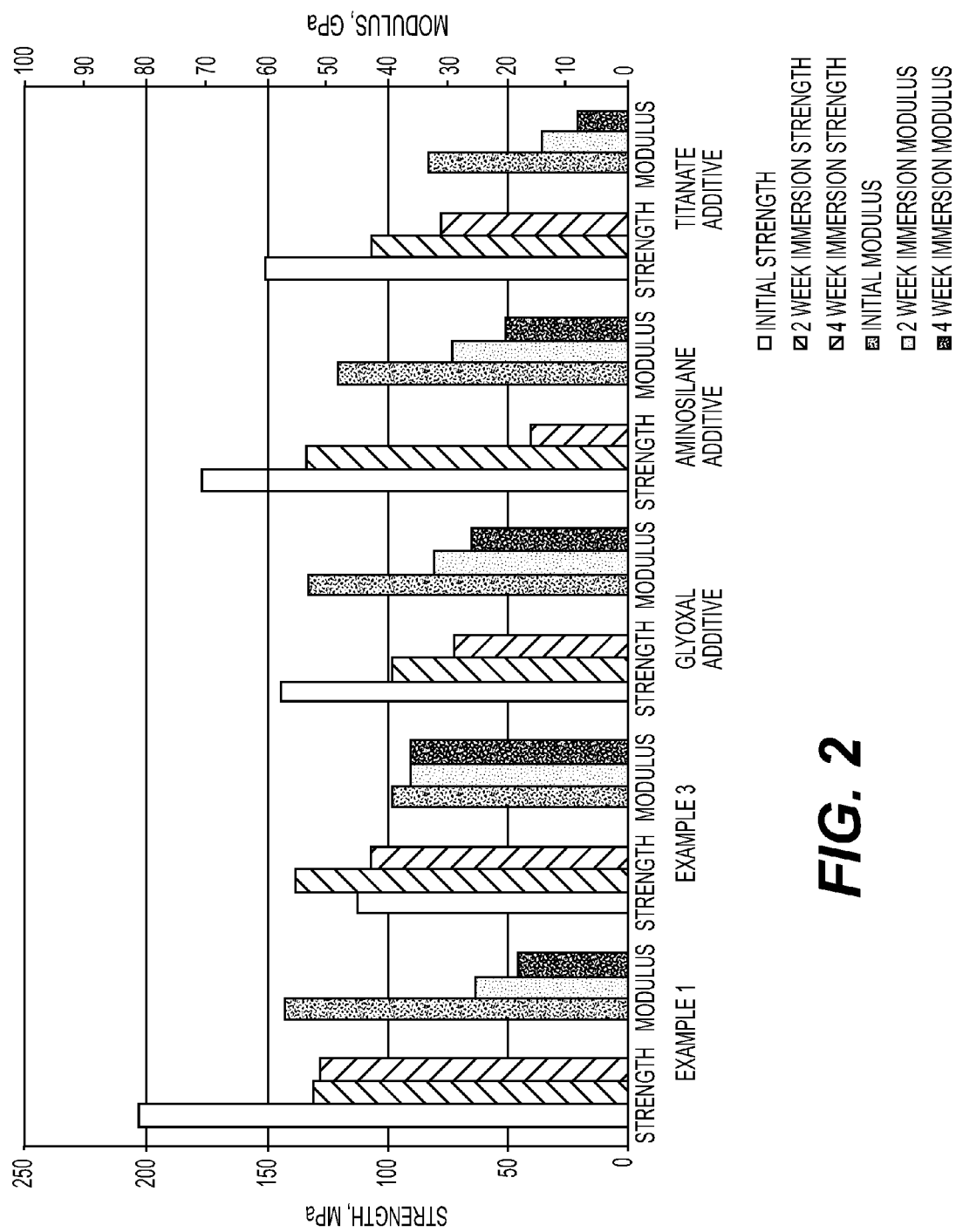
FIG. 2 is a chart showing comparisons between properties of example compositions described in this specification and known technologies.

FIG. 2 shows how the disclosed examples 1 and 3 above compare with other technology known in the art. Glyoxal is known to crosslink PVOH and so has been added in an attempt to slow down moisture ingression into the cured MDF cement. The addition of Glyoxal was found to help modestly, but did not give long-term modulus of elasticity or flexural strength retention. Aminosilanes have also been added to MDF cement to react with the PVOH and impact moisture resistance. The addition of aminosilanes was found to be non-beneficial upon long-term immersion in water. Titanates have also been added to MDF cement in an attempt to improve moisture resistance through crosslinking reactions with PVOH. The addition of titanates was found to be non-beneficial upon long-term immersion in water.

The left-most portion of FIG. 2 shows results for Examples 1 and 3 of the present disclosure. The first vertical bar at the left-most portion of FIG. 2, representing the strength of the material sample from example 1, illustrates a flexural strength in excess of 200 MPa. The strength of the sample decreased to approximately 130 MPa after 2 weeks of immersion in water, and approximately 125 MPa after 4 weeks of immersion in water. The modulus of elasticity of the sample from example 1 was initially approximately 58 GPa, then approximately 23 GPa after 2 weeks of immersion, and approximately 18 GPa after 4 weeks of immersion. The sample of example 3 had an initial flexural strength of approximately 120 MPa. The strength of the sample of example 3 then actually increased to approximately 140 MPa after 2 weeks of immersion in water, and decreased slightly to approximately 110 MPa after 4 weeks of immersion in water. The modulus of elasticity of the sample of example 3 was initially approximately 39 GPa, and then decreased only slightly to approximately 37 GPa after 2 weeks of immersion in water and after 4 weeks of immersion in water.

INDUSTRIAL APPLICABILITY

MDF cementitious compositions in accordance with various embodiments of the present disclosure may be used for structural purposes, much like fiberglass-reinforced thermoplastics and lightweight metals such as aluminum. In comparison to fiberglass-reinforced thermoplastics, the modulus of elasticity for MDF cements in accordance with various embodiments of this disclosure is generally 2-10 times higher than the modulus of elasticity of fiberglass-reinforced thermoplastics. These mechanical characteristics allow for usage of the MDF cement in applications where metals are currently in use and conversion to a molded material was previously prohibited because conventional cementitious composites lacked sufficient flexural strength and modulus of elasticity. In comparison to lightweight metals such as aluminum (modulus of ~70 GPa), the MDF cement materials of this disclosure have similar strength values but are generally less expensive. Therefore, die-cast aluminum parts or wrought aluminum fabrications may be replaced with MDF cement pieces in order to lower product cost.

The MDF cementitious composition in accordance with various embodiments of the present disclosure may be used to produce a finished, molded product that has excellent flexural strength and modulus of elasticity when first produced, and retains the majority of these desirable mechanical characteristics even after immersion in water or exposure to high humidity for extended periods of time.

FIG. 1 is a flowchart showing an exemplary sequence of steps that may be followed in producing a MDF cementitious composition in accordance with various embodiments of this disclosure. At step 320 a hydrogel pre-polymer blend may be prepared of saponified polyvinyl alcohol acetate (PVAA) with greater than or equal to a 85% saponification level and water in a ratio of polymer:water that falls within the range from approximately 100:75 to 100:150. As discussed above, the higher saponified grades of PVAA, such as those used in step 320 with greater than or equal to approximately 85% saponification levels are inexpensive and readily available when compared to the lower saponified grades of PVAA that have traditionally been used in the production of MDF cement. The potential problem of short processing times when using the higher saponified grades of PVAA may be alleviated by the introduction of an organic acid retardant into the mixture in order to allow enough processing time.

At step 322, the hydrogel pre-polymer blend may be mixed with high alumina cement (HAC) using high shear mixing. Starting with the hydrogel pre-polymer blend of the desired higher saponified grades of PVAA and water, rather than starting with the PVAA in powder form may also provide significant advantages in that the hydrogel pre-polymer blend is more conducive to high shear mixing. The hydrogel pre-polymer blend provides an ideal hydrogel elastomer for rubber-like high shear mixing. Starting with the hydrogel pre-polymer blend may enhance the processing of the composition, including increasing the time between when the mixing begins and when the MDF cementitious composite must be molded into its final form.

At step 324, a metallic coagent and a peroxide crosslinking initiator may be mixed in to the composition. As discussed above, the metallic coagent may be selected from a group of metallic acrylates and other similar metal-bound reactive monomers that may be reacted with peroxides. The peroxides used when the MDF composition is provided in bags may be peroxides with higher initiation temperatures than the peroxides used in other applications to ensure that no premature initiation of the crosslinking occurs before the bags are introduced into a mixing mechanism. The crosslinking of the alcohol groups of the polymer and metallic ions from the metallic coagent may overwhelm much of the displacement of ionic crosslinking that would have otherwise occurred without the metallic coagent and peroxide as a result of extended exposure of the finished, molded product to water. This mechanism is thought to be the reason MDF cementitious compositions in accordance with various embodiments of this disclosure exhibit significant increases in water resistance and retention of flexural strength and modulus of elasticity after immersion in water.

At step 326, an organic acid may also be mixed in as a retardant for improving the shelf life of the composition, and improving moisture resistance. As discussed above, the organic acid retardant may be selected from a group of organic acids including acetic acid, citric acid, tartaric acid, succinic acid, and polymeric acids such as polyacrylic acid. The organic acid retardant helps to counteract the reduced processing time that may result from using higher saponified grades of PVAA, such as PVAA that is great than or equal to 85% saponified.

At step 328, the mixture may be molded into a desired configuration by hot pressing the mixture with pressures that are greater than approximately 5 MPa, and temperatures that are approximately 90 degrees C., ±30%. This hot pressing process may be maintained for approximately 30 minutes, but depends on the thickness of the article as the material is molded and cured into its final form. The final molded article may be post-cured at step 330, with the temperatures being maintained at approximately 90 degrees C.±30% for anywhere from several minutes to several days, depending on the application.

It will be apparent to those skilled in the art that various modifications and variations can be made to the disclosed cementitious composition without departing from the scope of the disclosure. Other embodiments of the composition will be apparent to those skilled in the art from consideration of the specification and practice of the disclosure herein. It is intended that the specification and examples be considered as exemplary only, with a true scope of the disclosure being indicated by the following claims and their equivalents.

What is claimed is:

1. A cementitious composition, comprising:
    polyvinyl alcohol;
    high alumina cement;
    water;
    a metallic coagent, wherein the metallic coagent is selected from the group comprising: zinc diacrylate (ZDA), zinc monoacrylate (ZMA), zinc dimethacrylate (ZDMA), calcium diacrylate (CDA), aluminum triacrylate, and magnesium diacrylate; and
    a peroxide crosslinking initiator.

2. The cementitious composition of claim 1, wherein proportions of ingredients of the composition by weight comprise:
    90-110 parts polyvinyl alcohol;
    150-250 parts water;
    1200-3000 parts high alumina cement (HAC);
    30-100 parts metallic coagent; and
    3-30 parts peroxide crosslinking agent.

3. The cementitious composition of claim 1, wherein the metallic coagent is a metal-bound reactive monomer that is reacted with peroxides.

4. The cementitious composition of claim 1, wherein the peroxide crosslinking initiator is selected from the group comprising: dicumyl peroxide, a,a'-bis(tert-butylperoxy)diisopropylbenzene, 1,1-di(tert-butylperoxy)-3,3,5-trimethylcyclohexane, n-butyl-4,4-di(t-butylperoxy)valerate, and lower-temperature peroxides including one or more of methyl ethyl ketone peroxide (MEKP) and hydrogen peroxide.

5. The cementitious composition of claim 1, wherein the polyvinyl alcohol is a saponified polyvinyl alcohol acetate (PVAA) with a saponification level of greater than or equal to about 85%.

6. The cementitious composition of claim 1, further including an organic acid retardant selected from the group comprising: acetic acid, citric acid, tartartic acid, succinic acid, and polymeric acids.

7. The cementitious composition of claim 2, further including 10-30 parts by weight of an organic acid retardant selected from the group comprising: acetic acid, citric acid, tartartic acid, succinic acid, and polymeric acids.

8. A molded article made from a macro-defect-free (MDF) cementitious composition comprising:
    polyvinyl alcohol;
    high alumina cement;
    water;
    a metallic coagent, wherein the metallic coagent is selected from the group comprising: zinc diacrylate (ZDA), zinc monoacrylate (ZMA), zinc dimethacrylate (ZDMA), calcium diacrylate (CDA), aluminum triacrylate, and magnesium diacrylate; and
    a peroxide crosslinking agent.

9. The molded article of claim 8, wherein proportions of ingredients of the MDF cementitious composition by weight comprise:
    90-110 parts polyvinyl alcohol;
    150-250 parts water;
    1200-3000 parts high alumina cement (HAC);
    30-100 parts metallic coagent; and
    3-30 parts peroxide crosslinking agent.

10. The molded article of claim 8, wherein the metallic coagent is a metal-bound reactive monomer that may be reacted with peroxides.

11. The molded article of claim 8, wherein the peroxide crosslinking agent is selected from the group comprising: dicumyl peroxide, a,a'-bis(tert-butylperoxy)diisopropylbenzene, 1,1-di(tert-butylperoxy)-3,3,5-trimethylcyclohexane, n-butyl-4,4-di(t-butylperoxy)valerate, and lower-temperature peroxides.

12. The molded article of claim 8, wherein the polyvinyl alcohol is a saponified polyvinyl alcohol acetate (PVAA) with saponification levels of greater than or equal to about 85%.

13. The molded article of claim 8, wherein the flexural strength of the molded article after approximately 4 weeks of immersion of the molded article in water retains at least 70% of the flexural strength of the molded article immediately after the article is molded and cured.

14. The molded article of claim 8, wherein the modulus of elasticity of the molded article after approximately 4 weeks of immersion of the molded article in water retains at least 50% of the modulus of elasticity of the molded article immediately after the article is molded and cured.

* * * * *